United States Patent Office 3,582,505
Patented June 1, 1971

3,582,505
ION EXCHANGERS FROM POLY(AMINOSTYRENE) AND ETHYLENE IMINE
Geert Jan de Jong, Boekelo, Netherlands, assignor to N.V. Octrooien Maatschappij "Activit," Amsterdam, Netherlands
No Drawing. Filed Oct. 23, 1969, Ser. No. 868,939
Claims priority, application Netherlands, Oct. 24, 1968, 6815256
Int. Cl. C08l 27/08
U.S. Cl. 260—2.1
6 Claims

ABSTRACT OF THE DISCLOSURE

Anion exchangers are prepared from polymers of vinyl aromatic hydrocarbons in which primary amino groups have been introduced into the aromatic nuclei by reacting such aminated polymers with ethylene imine. If desired, the thus obtained weakly basic polyamine resin may be quaternarized.

This invention relates generally to the preparation of ion exchangers, and more particularly to the preparation of ion exchangers based on vinyl aromatic hydrocarbons in which amino groups are introduced.

A process is known for preparing anion exchangers containing polyamino groups on a base of copolymer polystyrene divinylbenzene resins, and in which a chloro methyl group is first introduced into the aromatic nuclei of the resin, and then the resulting benzyl chloride groups are converted into substituted benzyl amines with the aid of ethylene imine. In such process for introducing amino functions into the resin, the first part of the reaction, that is, the haloalkylation, must be carried out in an organic solvent.

It is an object of this invention to provide a process of preparing anion exchangers containing polyamino groups on a base of a polymer of vinyl aromatic hydrocarbons, and in which, starting with such matrix resin, the introduction of amino groups can be carried out entirely in an aqueous medium.

Another object is to provide anion exchangers of the described type which have a particularly high activity.

In accordance with this invention, anion exchangers of particularly high activity are obtained by reacting ethylene imine with the aminated polymers that result from the introduction of amino groups into vinyl aromatic hydrocarbon resins, as by the known method of nitrating the resin and then reducing the nitro groups. If desired, the weakly basic polyamine resin that results from the above may be quaternarized in a known manner.

The polymer matrices employed in the production of anion exchangers according to this invention may be any of those usually used as matrices of ion exchangers. Thus, the starting material of the process according to the invention may be a homogeneous or an inhomogeneous or porous type of polymer which may vary rather broadly as to its density or degree of cross-linking. Among the suitable starting materials are, for example, polystyrene and polymers based on vinylbenzenes having substitutions in their aromatic nuclei of alkyl groups, such as vinylethylbenzenes, vinyl toluene, vinylxylenes and the like, which can be cross-linked in any suitable manner, such as by copolymerisation with divinyl benzene or bisvinyl esters, or by condensation with formaldehyde or with chloro methyl ether.

Preferred starting materials for the process according to this invention are copolymers of styrene or of the above mentioned vinyl benzenes obtained by copolymerisation thereof with polyalkylenic unsaturated compounds such as divinyl benzene, divinyl toluene, trivinyl benzene and the like, with such cross-linking agents being present in the copolymer in amounts of from 0.1 to 25 wt. percent, and even in amounts as high as 50 wt. percent in the case of certain porous polymers.

The aminated polymers that are reacted with ethylene imine to obtain anion exchangers according to this invention should have an average of from 0.5 to 2.0 amino groups introduced per aromatic nucleus. Although any vinyl aromatic hydrocarbon resin having primary amino groups in the benzene nuclei may be reacted with the ethylene imine according to this invention, it is preferred that the introduction of such primary amino groups be effected by nitrating and then reducing the resin matrix.

The above mentioned nitration of the resin matrix can be effected with 50 to 100% nitric acid or with a mixture of nitric acid and sulfuric acid. Where only nitric acid is employed, for example, 65% nitric acid, a nitration up to an average of about 1.0 nitro group per aromatic nucleus can be attained. If a mixture of nitric acid and sulfuric acid is used to attain a higher degree of nitration, such nitration is preferably carried out in two stages to avoid sulfonation. For example, in a first nitration stage nitric acid alone is employed to achieve approximately mono-nitration, that is, an average of about 1.0 nitro group per aromatic nucleus, and in a second nitration stage further nitration is effected with a mixture of nitric acid and sulfuric acid, such as a nitrating acid consisting of 2 parts, by volume, of 96% sulfuric acid, and 1 part, by volume, of 90–100% nitric acid.

The reduction of the nitro groups to amino groups can be effected in any way known for that purpose, but is preferably carried out in an aqueous medium. Such reduction in an aqueous medium may be effected with the aid of ferrous or stannous salts in aqueous hydrochloric acid, but is preferably effected in aqueous solutions of alkaline or ammonium sulfides or polysulfides so that the resin will be the only compound that is not dissolved. As is known, the reduction is effected in an autoclave at a temperature between 120 and 200° C.

The reaction of ethylene imine with amines is known per se and, in the process according to this invention, the reaction of ethylene imine with the aminated polymer may be effected by any procedure previously employed for such known reaction of ethylene imine with amines.

The course of the reaction can be schematically represented by the following formulae:

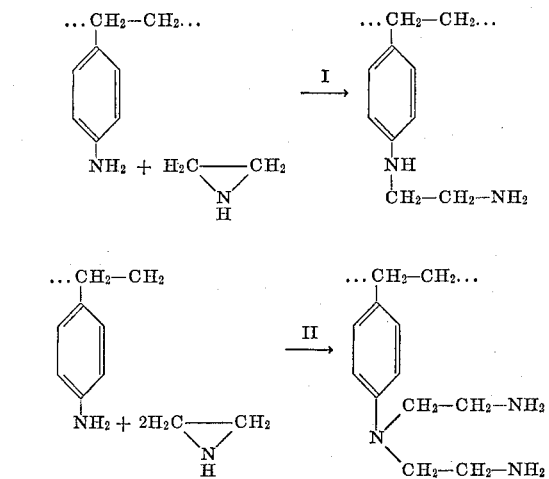

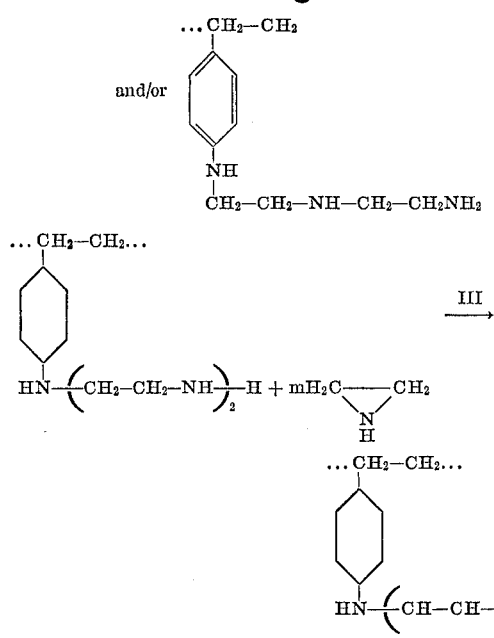

and/or

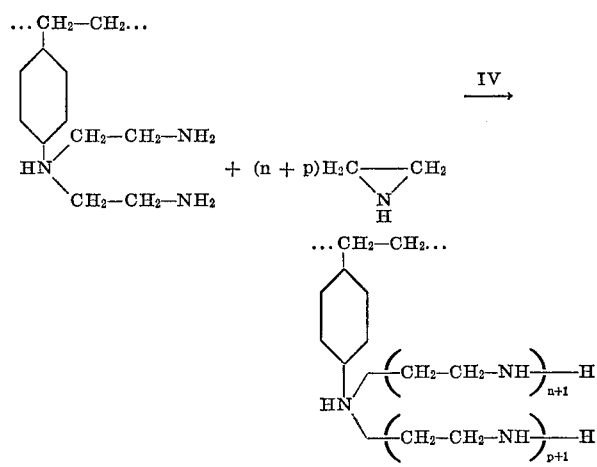

In order to obtain products with the highest nitrogen content, it is desirable that the above reactions I and II should go to completion as far as is possible and, in any event, care should be exercised to ensure that the self-condensation reactions III and IV do not use up so much of the ethylene imine as to leave available nucleus-amino groups that are not utilized. If desired, the reaction of ethylene imine with the aminated polymer may be effected in two stages, that is, in a first stage or step during which reactions I and II are promoted as much as possible, and in a second stage in which the product obtained from the first stage has additional ethylene imine groups attached thereto.

Reactions I and/or II can be promoted by soaking the aminated resin with diluted acid so as to acidify the resin to a pH of about 5.0 before contacting the aminated resin with ethylene imine. The reaction of the aminated resin with ethylene imine can be carried out in an aqueous medium or, if desired, also in the presence of an organic solvent in which the ethylene imine is soluble and the resin is not. As an alternative, the reaction can be conducted in an aqueous medium without a solvent being present. Further, it will be understood that the dry resin can also be reacted with ethylene imine.

The reaction can be conducted at a temperature between $-15$ and $+200°$ C., and preferably at a temperature between 20 and 90° C. For temperatures above the boiling point of ethylene imine (57° C.), the reaction is carried out in an autoclave under pressure.

In principle, an infinite number of ethylene imine molecules can be reacted with each $NH_2$ group of the aminated resin according to the above reactions III and IV. As a practical matter, the number of ethylene imine molecules that can be introduced for each $NH_2$ group is limited, apart from the reaction conditions, only by steric hindrance and the porosity of the resin. Preferably, at least one ethylene imine molecule is introduced per $NH_2$ group of the aminated resin. With any particular resin matrix, the capacity of the anion exchanger based thereon is increased in accordance with the number of ethylene imine molecules introduced per $NH_2$ group of the aminated resin. With known resin matrices, the average number of ethylene imine molecules introduced per $NH_2$ group of the aminated resin is generally in the range of 0.5 to 5.0, and preferably in the range of 1.0 to 2.5. Such proportions of the ethylene imine molecules to the $NH_2$ groups in the reaction product can be achieved by carrying out the reaction in an excess of ethylene imine.

The new products obtained by the process according to this invention are weakly basic anion exchangers with a particularly high activity, and can be converted into strongly basic anion exchangers by quaternarisation, for example, with the aid of methyl iodide.

The invention will now be further described with reference to the following examples which are merely illustrative:

EXAMPLE 1

(a) To a mixture of 400 gms. water, 1 gm. gelatine, 1 gm. NaCl and 1 gm. bentonite, at room temperature and without stirring, there were added 41.67 gms. styrene, 8.33 gms. divinyl benzene 60%, 50 gms. hexane and 0.5 gm. benzoylperoxide.

Thereafter, and while stirring, the temperature was raised to 75° C. and during 15 hours the polymerisation was carried out under reflux. After cooling the pearls obtained were filtered, washed with water and dried. The product had a pore volume (measured with alcohol) of 88%.

(b) To 39.5 gms. of the product obtained according to (a) 400 ml. 90% nitric acid was added, and the mixture was kept at a temperature of about 6° C. for 22 hours. Thereafter, nitration was effected with a nitrating acid consisting of 1 part by volume 100% nitric acid and 2 parts by volume 96% sulfuric acid, first during 3½ hours at 6° C. and then during 66 hours at 20° C. After filtration and washing, a nitrated resin was obtained with a nitrogen content (based on dry resin) of 12.3% and a dry resin content of 62.03%.

(c) 100 gms. of the product obtained in accordance with (b) with a dry resin content of 62.3% were introduced into a 1 l. glass autoclave provided with a stirrer and a thermometer. A sodium sulfide solution was prepared from a mixture of 80 gms. sulphur powder, 600 gms. $Na_2S.9H_2O$ and sufficient water to provide 800 ml. of solution. 500 gms. of this sodium sulfide solution were introduced into the autoclave, whereupon the autoclave was closed and for 7 hours the reaction mixture was kept at a pressure of 7 atm. at 160–168° C. After cooling, filtering and washing, 115.2 ml. wet resin was obtained with a dry resin content of 0.4 gm. per ml. and a nitrogen content of 14.5% (based on dry resin).

(d) 40 ml. of the wet resin obtained according to (c) was brought to pH to 4.45 with diluted hydrochloric acid and then dried. Thereafter, 16 ml. ethylene imine was added whereby the temperature increased to 76° C.; after keeping the mixture another 18 hours at room temperature, the resin was filtered and washed. 52 ml. of a wet resin was obtained, containing 23 gms. dry product and having a nitrogen content of 19.82% based on the dry substance.

EXAMPLE 2

(a) The copolymer matrix was prepared in the manner described in step (a) of Example 1, however, in this case, 40 gms. styrene, 10 gms. divinyl benzene and 43 gms. hexane were used, whereby a resin was obtained with a pore volume of 100%.

(b) 31 gms. of the copolymer obtained according to (a) were added over a period of 2 hours to 400 ml. 90% nitric acid, and then the mixture was kept at about 5° C. for 21 hours. Thereafter, the resin was decanted three times with nitrating acid and then further nitrated for 7 hours at 5° C. followed by 15 hours at room temperature. After washing to remove all acid, 106.09 gms. of resin were obtained having a dry substance content of 45.6% and a nitrogen content of 11.9%.

(c) 100 gms. of the product obtained according to (b) were reduced in the manner described in step (c) of Example 1, but in this case with 380 gms. of the sodium sulfide solution in the course of 7 hours whereby, after washing, 116.1 ml. resin was obtained containing 34.25 gms. dry substance with a nitrogen content of 14.5%.

(d) 20 ml. of the resin obtained according to (c) were acidified to a pH 4.5 with diluted hydrochloric acid and taken up in 15 ml. water. Then 15 ml. ethylene imine was added whereby the temperature increased to 30° C. The mixture was kept at 40° C. for 15 hours and, thereafter, it was washed with water. 26.9 ml. product was obtained corresponding to 7.85 gms. dry product with a nitrogen content of 18.7%.

EXAMPLE 3

(a) 234.9 gms. styrene, 8.1 gms. divinyl benzene and 1.4 gms. benzoyl peroxide were added to a mixture of 350 gms. water, 5 gms. metacol, that is, the sodium salt of polyacrylic acid, and 1 gm. tricalcium phosphate at room temperature. After a polymerisation period of 15 hours during which the mixture was stirred and refluxed, the mixture was cooled and a glassy product was filtrated, washed with water and dried.

(b) 120 gms. of the product obtained according to (a) were nitrated in the course of 16 hours with 1200 ml. 90% nitric acid and, thereafter, it was treated with nitrating acid for 16 hours at 8° C. After removal of all acid by washing, 98 gms. of a wet product were obtained, corresponding with 69 gms. dry substance with a nitrogen content of 14%.

(c) 90 gms. of the wet product obtained according to (b) were reduced in the manner described in step (c) of Example 1, but with 275 gms. of the sodium sulfide solution whereby 92.8 ml. resin was obtained corresponding to 50.7 gms. dry substance with a nitrogen content of 14%.

(d) 20 ml. water was added to 40 ml. of the product obtained according to (c) after the resin was acidified to pH 5.5 with hydrochloric acid. After adding 36.2 gms. ethylene imine, the mixture was kept at 50° C. for 16.5 hours, whereafter, after washing and drying, a product was obtained with a dry substance content of 55.3% and a nitrogen content of 20%. After treating 31 ml. of this product with 8 gms. ethylene imine in the same manner for another 16.5 hours, 36.4 ml. product was obtained corresponding to 10.43 gms. dry substance with a nitrogen content of 21.2%.

The particularly high activity of anion exchangers obtained by the process according to this invention is demonstrated by the following comparative experiments:

The anion exchangers constituted by the polyamine resins produced in Examples 1, 2 and 3 were compared with Imac A 20 and Amberlite I.R.A. 93 which are commercially available non-quaternized anion exchangers obtained by chloromethylation and subsequent amination of styrene-divinyl benzene copolymers.

In the comparison tests, each resin was completely regenerated with NaOH and washed, and then about 25 ml. of the resin was introduced into a column having an internal diameter of 1.2 cm. with the volume and weight of the introduced resin being carefully measured. In the case of each resin, the column was percolated with 100 ml. 1 N HCl and thereafter with 125 ml. of washing water, whereupon the amount of HCl absorbed was determined by titration of the effluent.

The results of the above comparative tests are given in the table below in which the capacity of each resin in meq./l. appears in column A, the capacity in meq./gm. dry resin appears in column B, and the dry substance content of each resin, in wt. percent, is given in column C.

|  | A | B | C |
|---|---|---|---|
| Imac A 20 | 2,042 | 6.20 | 45.8 |
| Amberlite I.R.A. 93 | 1,559 | 4.58 | 46.4 |
| Example 1 | 3,240 | 7.86 | 52.4 |
| Example 2 | 2,332 | 8.0 | 39.0 |
| Example 3 | 3,538 | 11.25 | 52.4 |

What is claimed is:

1. Process for preparing anion exchangers from a polymer of vinyl aromatic hydrocarbns having primary amino groups introduced into its aromatic nuclei so as to provide an aminated polymer having, on the average, between 0.5 and 2.0 amino groups introduced per aromatic nucleus, consisting essentially of the step of reacting said aminated polymer with ethylene imine at a temperature between −15 and +200° C., the amount of ethylene imine thus reacted with said aminated polymer being sufficient to introduce an average of from 0.5 to 5.0 ethylene imine molecules per $NH_2$ group of said aminated polymer.

2. Process according to claim 1, in which said aminated polymer is soaked with diluted acid so as to be acidified to a pH of approximately 5.0 prior to being reacted with said ethylene imine.

3. Process according to claim 1, in which the reaction of the aminated polymer with ethylene imine is carried out in an aqueous medium.

4. Process according to claim 1, in which an excess of ethylene imine is employed for said reaction with the aminated polymer.

5. Process according to claim 1, in which said primary amino groups are introduced into the aromatic nuclei of said polymer of vinyl aromatic hydrocarbons by first nitrating said polymer and then reducing the nitrated polymer in an aqueous medium.

6. Anion exchangers produced according to the process of claim 1.

References Cited

FOREIGN PATENTS 942,422  11/1963  Great Britain.

WILLIAM H. SHORT, Primary Examiner

M. GOLDSTEIN, Assistant Examiner